United States Patent [19]

Sears et al.

[11] 4,002,362

[45] Jan. 11, 1977

[54] BUMPER CUSHION RUB STRIP

[75] Inventors: Henry Eldon Sears, North Kitchener; John Charles Prast, Kitchener; Raymond Wiefred Mc Nally, Kitchener; Calvin C. Lee, Kitchener; William F. Mc Avey, Waterloo, all of Canada

[73] Assignee: B. F. Goodrich Canada Limited, Canada

[22] Filed: July 1, 1975

[21] Appl. No.: 592,345

Related U.S. Application Data

[63] Continuation of Ser. No. 406,484, Oct. 15, 1973, abandoned.

[52] U.S. Cl. .......................... 293/62; 293/DIG. 4; 293/71 R

[51] Int. Cl.[2] .......................... B60R 19/08

[58] Field of Search ......... 293/1, DIG. 4, 62, 71 R; 161/4–6; 52/716–718

[56] References Cited

UNITED STATES PATENTS

| | | | |
|---|---|---|---|
| 2,145,952 | 2/1939 | Ryan | 293/71 R |
| 2,959,146 | 11/1960 | Erkert | 293/DIG. 4 |
| 3,019,758 | 2/1962 | Erkert | 293/62 |
| 3,737,972 | 6/1973 | Smoot | 293/DIG. 4 |
| 3,777,438 | 12/1973 | Brown | 293/1 |

*Primary Examiner*—Robert W. Saifer

*Attorney, Agent, or Firm*—Watson, Cole, Grindle & Watson

[57] ABSTRACT

This invention involves a rub strip which is a composite plastic strip having a hard resilient plastic base member and a yieldable cushion member permanently attached thereto of appropriate shape and construction such that the benefits of the characteristics of both components of the rub strip are realized in practice.

2 Claims, 10 Drawing Figures

35

33

33

31

BUMPER CUSHION RUB STRIP

This is a continuation, of application Ser. No. 406,484 filed 10/15/73, now abandoned.

This invention relates to a new and improved rub strip for use on motor vehicles.

Such a rub strip is intended for placing on the bumpers of a vehicle, and also along the side of the body of a vehicle to protect the vehicle from various kinds of damage. Typically, such a rub strip will be placed horizontally along the bumpers, vertically along the upright bumper guards and horizontally along each side of the vehicle body.

For better protection of vehicles, rub strips have become common and conventional rub strips are generally of plastic cushion material mounted on a metal base fastened to the bumper and to the sides of the vehicle body.

A serious disadvantage of conventional rub strips has been related to the composite nature of their construction. The metal base and plastic cushion which has been typically provided are expensive items to manufacture and in addition the bonding between the plastic cushion and the metal base has frequently not been very satisfactory.

During recent years it has become common to provide bumper guards in a generally vertical direction on the bumpers of motor vehicles. The purpose of the bumper guards is to protect the automobile and the bumper and also to prevent bumpers from becoming interlocked when they are in contact in parking and in other circumstances where the bumper of one car contacts the bumper of another. Rub strips of the composite structure just described have been conventionally placed along such upright bumper guards. Such conventional rub strips on upright bumper guards have not been satisfactory because if the bumper guard receives an impact as in a low speed collision the metal base member is usually permanently bent, and sometimes seriously bent, and it is very difficult if not impossible to straighten the base member back to its original position. This adds to the cost of relevant repairs because it is generally necessary to throw away a bumper guard rub strip member which has suffered any but the lightest damage.

It is an object of this invention to provide an improved rub strip particularly for bumpers and for bumper guards, as well as for the horizontal molding of an automobile, which improved rub strip overcomes to a large extent the disadvantage as referred to above.

The rub strip contemplated by the present invention is a composite plastic strip having a hard resilient plastic base member and a yieldable cushion member permanently attached thereto of appropriate shape and construction such that the benefits of the characteristics of both components of the rub strip are realised in practice.

It is a further object of the present invention to provide such a rub strip which consists of two members, or alternatively more than two members, permanently attached together as a unitary continuous structure.

An additional object is to provide a rub strip which can be easily bent into shapes having sharp changes of direction, for example, to follow the off-sets to clear bumper licence plate locations.

A still further object is to provide a rub strip of the kind herein described in continuous form rather than in individual lengths.

Other objects and advantages will be apparent from the entire specification and from the appended claims.

In broadest aspect the present invention contemplates a rub strip consisting of a hard resilient plastic base member of relatively thin section having a relatively flat lower surface and a non-flat and typically arched upper surface of the base member, with an integrally-connected yieldable cushion member of plastic material permanently attached to the base member.

It is contemplated that a rub strip of the kind just referred to will be manufactured by continuous extrusion whereby streams of the plastic material of appropriate composition can be continuously extruded and permanently bonded together as a composite unit.

A preferred embodiment of the invention will now be described with the assistance of the accompanying drawings wherein like parts are denoted by the same reference numerals throughout.

In the accompanying drawings.

Figure 1:
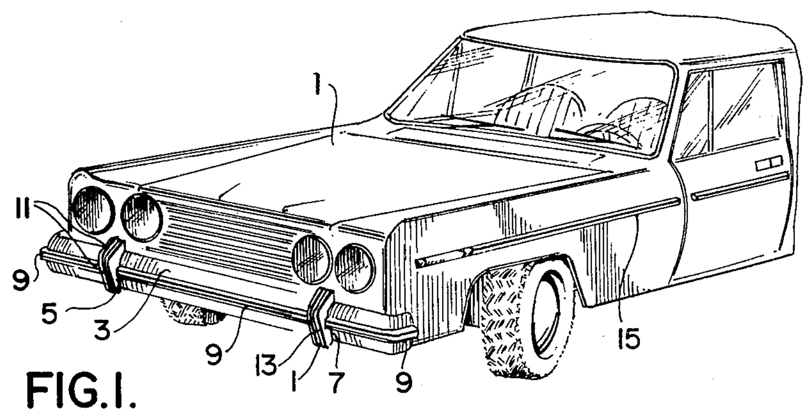
FIG. 1 shows a three-quarters oblique view of a portion of an automobile body showing the manner in which the rub strip members which are the subject of the present invention are used, as protection for the bumpers and as horizontal moldings along the side of the vehicle.

Referring now to the accompanying drawings, an automobile is shown at 1 having conventional parts which need not be referred in any great detail. Of particular interest for the purposes of the present invention are the bumper denoted by 3 and the upright bumper guards denoted by 5 and 7, upright bumper guard 5 being on the far side of the vehicle as seen in FIG. 1 and bumper guard 7 on the near side. Rub strip segments denoted by 9, 11 and 13 are illustrated attached to bumper 3. A horizontal rub strip denoted as 9 runs substantially the whole length of bumper 3, except where upright bumper guards 5 and 7 are attached to bumper 3, and shorter rub strips denoted by 11 and 13 are attached to the front of upright bumper guards 5 and 7, respectively.

Along the side of the vehicle illustrated in FIG. 1 is a horizontal rub strip denoted by 15 which is similar in construction to the rub strips shown at 9, 11 and 13. It is obvious that the purpose of the rub strips 9, 11, 13 and 15 is to generally protect the vehicle and in the case of the rub strips 11 and 13 the additional purpose is to act as a cushion against low speed impacts to which the bumper guards 5 and 7 may be subject.

Figure 5:
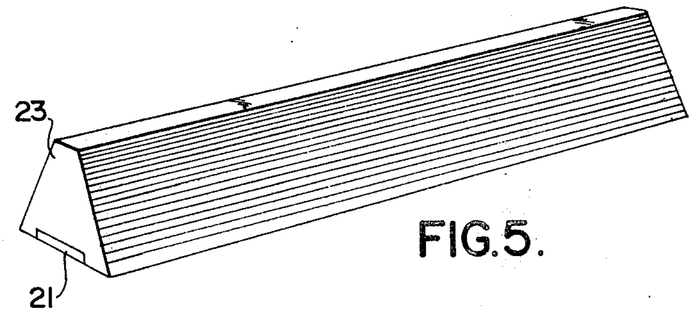
FIG. 5 shows an enlarged oblique view of a section of rub strip member which could be used in the places illustrated in FIG. 1, wherein the rub strip member consists of two component parts.
Figure 6:
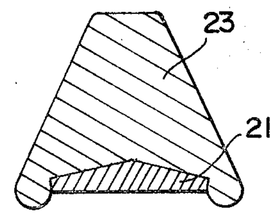
FIG. 6 shows a cross-sectional view corresponding to FIG. 5.
Figure 7:
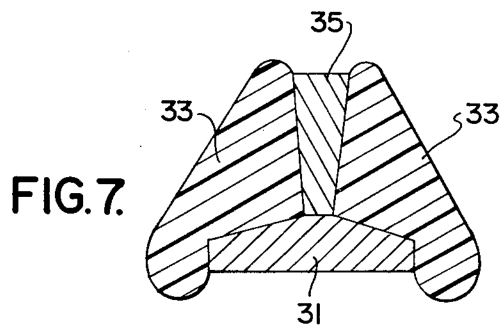
FIG. 7 shows a cross-sectional view similar to FIG. 6, but illustrating an alternative form of the rub strip member of the present invention wherein three component parts are integrally joined together.

The nature of the structure of the rub strips 9, 11, 13 and 15 can be seen with reference to FIGS. 5, 6, 7 and 8. In FIGS. 5 and 6 are illustrated what may be called a simple type of rub strip made of only two components, the base member denoted by 21 and the cushion member denoted by 23. In FIG. 7 is illustrated a three-component rub strip in which there is a base member denoted by 31 similar to base member 21 and a cushion member denoted by 33 attached to base member 31 as in the case of FIGS. 4 and 5. In addition there is shown in FIG. 7 a central strip member denoted by 35 which is integrally attached to cushion member 33 and to base member 31 exactly as base member 31 and cushion member 33 are attached to each other, and as base member 21 and 23 as shown in FIGS. 5 and 6 are attached to each other.

It may be of interest to describe the material in a little more detail which is preferably used for base members 21 and 31, and for cushion members 23 and 33 and for central strip member 35.

The base member 21 or 31 may typically be made of high impact rigid P. V. C. Compound, the cushion member typically of flexible P. V. C. Compound and the central strip member 35 typically of white or other selected colour of flexible P. V. C. Compound. Various alternatives are possible as indicated by the following typical mechanical properties:

| | Base Member 21 or 31 Rigid | Cushion Member 23 or 33 Flexible Black | Central Strip Member 35 Flexible White | ASTM |
|---|---|---|---|---|
| Specific Gravity | 1.32 ± 0.02 | 1.26 ± 0.02 | 1.38 ± 0.02 | D-792 |
| Hardness (Shore D) ± 3 | 80. | NA | NA | D-1706 |
| Hardness (Shore A) ± 3 | NA | 70 | 72 | D-1706 |
| Tensile at yield (psi) Min. | 6800 | NA | NA | D-638 |
| Tensile at break (psi) Min. | 5600 | 1500 | 1400 min. | D-638 |
| Tensile Modulus (psi) Min. | 300,000 | NA | NA | D-638 |
| Modulus at 100 % elong. (psi) | NA | 600 Min. | 500 Min. | D-638 |
| Elongation at yield (%) | 3.5 | NA | NA | D-638 |
| Elongation (%) | NA | 300 min. | 300 min. | D-638 |
| Heat Distortion Temp. (° C) | 70 | NA | NA | D-648 |
| Izod Impact at 73° (ft. lb./in. Min. | 6.0 | NA | NA | D-256 |
| Temp. (° C) | NA | −20 | −20 | D-746 |
| Fadeometer Aging | NA | 1000 hrs. no visible fading | | |
| Ozone Resistance | NA | 72 hrs. at 50 pphr. no cracking<br>96 hrs. at 1000 pphr. no cracking | | |

Figures 3, 4:
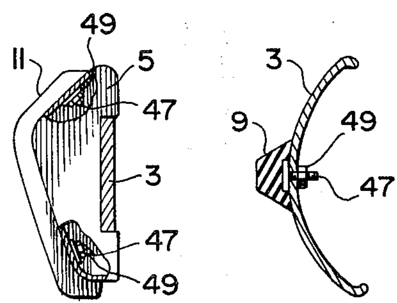
FIG. 3 shows a fragmentary cross-sectional view of the bumper of the vehicle illustrated in FIGS. 1 and 2, showing how the rub strip in the present invention is attached thereto.
FIG. 4 shows a fragmentary cross-sectional view illustrating the manner in which the rub strip is attached in a horizontal manner to the bumper seen in FIG. 1.

It may also be of interest to indicate the mechanical properties of the composite rub strip in accordance with FIGS. 4, 5 or 6 already referred to.

Tests have been conducted on this strip as follows:

| | | |
|---|---|---|
| 1) | Tear Test "C" Die | 200 lbs. |
| 2) | Cold Test −40° F on 1" × 6" × .075 | Passes |
| 3) | Heat Test on 3 slabs for 7 days at 250° F - Cool to Room Temp. Before Measuring - weigh loss not more than 3% | Passes |
| 4) | Increase in hardness after heat aging not more than ± 10 | + 05 |
| 5) | Bend Test at 180° | o.k. |
| 6) | $H_2S$ Staining | No Staining |
| 7) | Abraison | o.k. |
| 8) | Cracking | o.k. |
| 9) | Crazing | o.k. |

A series of impact tests conducted on rub strips made in accordance with FIGS. 5, 6, 7 and 8 shows that at temperatures as low as −20° F an impact of a 5,000 lb. vehicle against a six inch post at two miles per hour and five miles per hour does not result in any damage to any of the vehicle, the bumper or the rub strip.

The base members 21 and 31 because of their resilient and tough nature are for practical purposes as good as metal as a base for a cushion of the kind of cushion 23 and 33 and have considerable advantages not possessed by metal such as the better bonding between materials of the base and cushion and better resistance to permanent damage.

Figure 8:
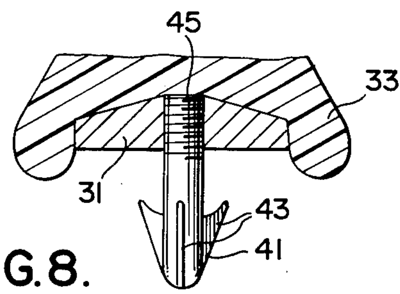
FIG. 8 is a fragmentary enlarged cross-sectional view of the lower part of a section similar to that shown in FIG. 7, but showing in addition the manner in which one form of a fastening means is attached to the rub strip.

Another characteristic of the materials and combination contemplated by this invention is the ability to provide easy and rapid attachment to whatever structural member of an automobile it may be intended to apply the rub strip. In FIG. 8 where an enlarged cross-sectional fragmentary portion of section similar to that shown in FIG. 7 is illustrated, the base member 31 is again shown with a fragment of a cushion member 33. An "arrowhead" type of fastening member is shown at 41 of the kind which can be simply pushed into place in an opening in a member to which the rub strip is to be attached and the rub strip thereafter remains permanently attached unless considerable force is used to disengage the rub strip. Horizontal moldings on motor cars are generally fastened to the body of the motor car by means of fastening means of the same general characteristics as fastening means 41 but not necessarily of the same construction. For example, "hair pin" type wire members may be used, which members consist of a wire configuration of somewhat the same outline shape as fastening means 41 and adapted to resiliently hold the molding or like member to an automobile body. In the present instance the fastening means 41 is shown merely by way of example, and as shown fastening lugs 43 are provided and the fastening means 41 has a threaded shank 45 extending into and in gripping engagement with the internal wall of an opening in base member 31.

An "arrowhead" type fastening means such as shown in FIG. 8 would normally be used where the rub strip occupies the position of rub strip 15 in FIG. 1, that is a horizontal rub strip running along the side of a car body, because in such circumstances it is not convenient to apply cap screws, bolts, or self-threading fasteners from the inside of the vehicle in view of the obvious structural difficulties.

In the case of rub strips 11 and 13 in FIG. 1 attached to upright bumper guards 5 and 7, the same problem does not usually exist and it is possible to have somewhat stronger fastening means such as combinations of bolts threaded into the base member 31 in a manner similar to that shown in FIGS. 3 and 4 with bolts threadably attached thereto, or by the obvious alternative of providing threaded openings in base member 31 and applying cap screws thereto.

Figure 2:
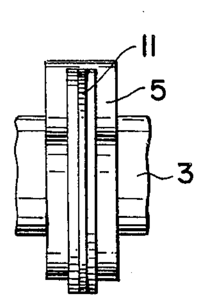
FIG. 2 shows a front elevation view of a bumper guard with rub strip as contemplated by the present invention of the kind shown in FIG. 1, as seen from immediately in front of the vehicle.

Referring to FIGS. 2 and 3 the detail of upright bumper guard members such as bumper guard member 5 are shown attached to bumper 3. The rub strip 11 as particularly shown in FIG. 7 is attached to the bumper by means of bolt shafts such as is illustrated at 47 and by nuts such as shown at 49. The obvious alternatives of using cap screws and of course self-threading screws is not shown but will be obvious to persons familar with automobile hardware. It may be emphasized again that because of the hollow construction of upright bumper guard members of the type shown at 5 and 7, it is possible to use almost any kind of fastening means and generally speaking the conventional bolt and nut or cap screw type of fastening will be found easier and cheaper to use, where the assembly can be handled simply by applying the fastening means from the inner side of the bumper guard member typified by bumper guard 5 of FIGS. 2 and 3.

Referring to FIG. 4, the segment rub strip 9 is attached to bumper 3 and in this instance a bolt 47 and nut 49 as in FIGS. 2 and 3, but of course ordinary cap screws could be used.

Figure 9:
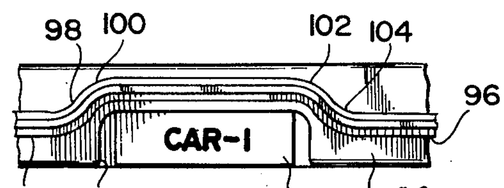
FIG. 9 shows a fragmentary elevation view indicating the manner in which the rub strip of the present invention can be bent to follow sharp off-sets in direction; and, FIG. 10 shows an oblique three-quarters view of a portion of a plastic extruding machine indicating the manner in which a strip of material such as that illustrated in FIG. 7 would be manufactured.

Referring now to FIG. 9 one of the particular advantages of the rub strip as herein described will be seen, namely its ability to be off-set around the licence plate or other object attached to the bumper. At 90 is shown a fragmentary section of a bumper having an off-set panel shown at 92 for the place where a licence plate is attached. The licence plate is shown at 94. The rub strip in this Figure is denoted by 96 and it may be similar to the rub strip shown in any one of FIGS. 5, 6, 7 and 8. Rub strip 96 is horizontally-placed on the right-hand side of FIG. 9 and at 98 bends sharply upward, turns again at 100 in a horizontal direction, turns vertically downward again at 102 and resumes its horizontal direction at 104.

There may be an actual licence plate panel 92, or the licence plate 94 may be simply bolted to the bumper. In either case, the rub strip will have to be off-set.

It has been found that with the rub strip as shown and described herein, the rub strip may as shown in 96 be bent to form a configuration as shown in FIG. 9 or in similar configuration without difficulty. Simple heating is all that is required to bend the rub strip.

In order to heat the rub strip it may simply be immersed in a vessel of hot water for sufficient length to heat the portion where bends will be made. The rub strip 96 will become very pliable whereupon it can be bent to the desired length, fastened in place and then allowed to set in that manner.

Alternatively, for quantity production for a particular automobile, sections of rub strip may be heated and bent by production machinery in an obvious way and the resulting rub strip section produced with pre-bent portions of the proper size and shape ready for fastening to motor cars.

As has already been stated, the rub strip member contemplated by this invention is desirably a composite member with the individual components like base 21 and cushion 23, and like base 31 and cushion 33 and central member 35. Such a composite member in each case is desirably made by extrusion. Extrusion apparatus is known which is capable of extruding composite members, and such apparatus should be used. Examples of apparatus which is capable of producing such a composite structure are as follows:

1. The apparatus sold under the trade name "Power Line" made by Danson Corporation Ltd.;
2. The extruder denoted by the name "Piggyback" made by Thermoplastic Equipment Corporation; and,
3. The extruder denoted by the name "Pacemaker" made by NRM Corporation.

In all such apparatus it is possible to extrude a composite longitudinal member by the use of proper dies at the outlet. It is not necessary to describe in detail the method of plastic extrusion as this is well known to persons skilled in the art, but it is desired to make some comment on the form of the extrusion dies which are used.

Figure 10:
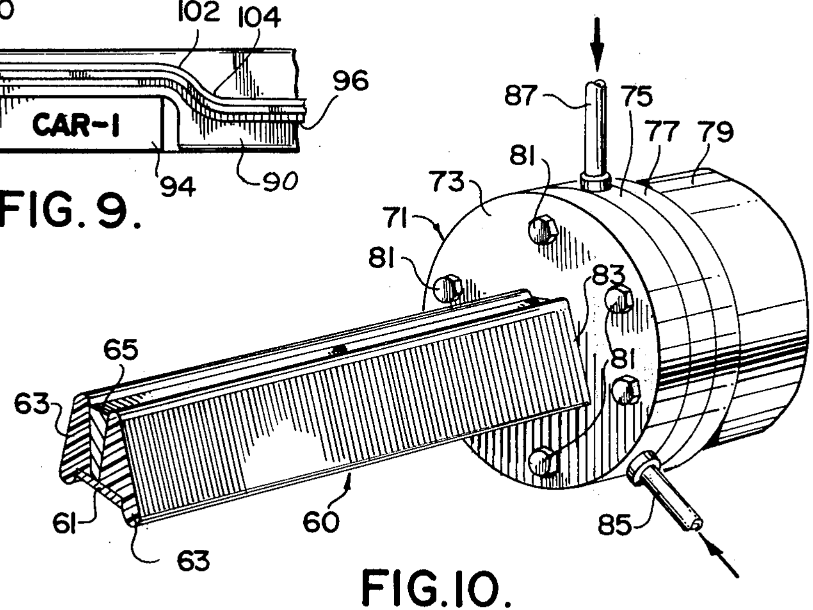

Referring to FIG. 10 where there is shown an oblique three-quartersview of a portion of a plastic extruding machine, particularly showing the extrusion dies, a section of rub strip stock is shown at 60 wherein the base member is denoted as 61, the cushion member as 63 and the central member as 65. It will be obvious that the structure just referred to is very similar to that shown in FIG. 7.

The rub strip stock shown in FIG. 10 emerges from a die combination shown generally at 71. Die combination 71 consists of a combination of three die elements denoted by 73, 75 and 77. The die elements 73, 75 and 77 are rigidly attached to the extrusion cylinder of an extrusion machine shown in a fragmentary form at 79 and are firmly bolted thereto by means of bolts denoted as 81. The orifice from which the rub strip stock emerges is shown at 83 and orifice 83 has an outline contour which conforms precisely to the cross-sectional shape of the rub strip stock such as is apparent from examination of FIG. 10 and such as is shown in FIG. 7.

It is contemplated that the material for the base member 61 will be inserted into the process at die member 73 by means of a tube denoted by 85 through which flows molten plastic material from a supply means, not shown, having the composition required for base member 61. The interior of die element 73 is provided with suitable indentations such that the material from tube 85 is directed to a rectangular orifice corresponding generally to the cross-sectional shape of base member 61 where it meets the cushion member formed upstream of die element 73.

Die element 75 is similar to die element 73 and provided with a tube denoted by 87 similar to tube 85 already referred to and it is contemplated that molten plastic material to form the central member 65 will be applied to die element 75 through tube 87, and as in the case of die element 73, suitable indentations will be provided in die element 75 such that there will be an orifice corresponding to the general cross-sectional shape of central element 65.

In this embodiment die element 77 is used to form the two portions of cushion member 63, and the plastic material for cushion member 73 can be fed through the orifices in die element 77 from cylinder 79. That is to say, the largest bulk of material, the material for the cushion member 63 is provided in the barrel of the extruding machine 79 and the components of smaller volume, the base member 61 and central member 65 are applied to cushion member 63 when all are in a hot and liquid condition in die elements 73 and 75 respectively, so that the rub strip stock emerges from orifice 83 in the form shown.

Various other equipment is of course necessary to produce the extrusion. For example it is necessary to provide suitable rollers so that the extruded rub strip stock 60 emerging from orifice 83 does not sag and become distorted, and it is also necessary to provide a steady pull at some point in the rub strip stock after it has become reasonably hard so that the slack is taken up in the rub strip stock that is being extruded. Additionally, water sprays and water baths will normally be provided to cool the rub strip stock after it emerges from the orifice 83. Such equipment and many other items of industrial equipment will also be used but are not described as being standard equipment well known to one skilled in the art.

With further reference to FIG. 10, the more complex form or rub strip stock as shown in FIG. 7 is referred to, but it will be obvious that a simpler form of rub strip stock without a central element such as central element 35, for example, the form of rub strip shown in FIGS. 5 and 6 can be produced in a manner described in relation to FIG. 8 but with greater simplicity. Ordinarily if a more simple rub strip stock such as is shown in FIGS. 5 and 6 were to be made, there would need to be only one input of material other than that supplied through cylinder 79. For example, there might only be the input such as shown in tube 85 in FIG. 9.

After the stock is extruded it is cut into suitable lengths and holes such as hole 45 in FIG. 8 are drilled if desired and such holes may be tapped if desired depending on the exact nature of the use. Fastening elements such as "arrowhead" type fasteners of the kind shown in FIG. 8, may be used if desired, all of which being a matter of choice depending on the circumstances.

It will be obvious from the description of typical manufacture of the rub strip described herein that the process is continuous, and this by itself is a significant advantage. It is possible to make molded sections of rub strip by injection molding but injection molding does not lend itself to the manufacture lengths of rub strip much in excess of approximately 36 inches. By means of the present invention a rub strip of several hundred feet in length can be manufactured and while such a length would not be used on one vehicle, it makes the resulting product very convenient from a storage standpoint and capable of being cut to lengths as required with a minimum of wastage.

It will be seen that the rub strip described herein possesses considerable advantages over a prior art rub strip structure, is cheap and simple to manufacture and easily installed and replaced.

The embodiments of the invention in which an exclusive property or privilege is defined as follows:

1. A rub strip structure for automotive use comprising a composite plastic strip formed by a continuous extrusion process, the composite plastic strip being made up of a hard resilient plastic base member, constituting an integral part of said strip, the hard resilient plastic base member having a relatively flat bottom surface and a slightly arched upper surface with a thickness which is relatively small compared to the width of said bottom surface; and a yieldable cushion member of generally trapezoidal cross sectional shape, having its largest width adjacent said base member and adapted to surround the top surface and side surfaces of said base member and permanently bonded to said base member, and fastening means supported solely by said base member, said fastening means extending into an opening in said base member and being gripped by the inner walls of said opening within the bottom surface of said base member so as to be held in engagement with said base member.

2. A rub strip structure for automotive use comprising a composite plastic strip, the composite plastic strip being made up of a hard resilient platic base member constituting an integral part of said strip; the hard resilient plastic base member having a relatively flat bottom surface and a slightly arched upper surface with a thickness which is relatively small compared to the width of said bottom surface; and a yieldble cushion member of generally trapezoidal cross sectional shape, having its largest width adjacent said base member and adapted to surround the top surface and side surfaces of said base member and permanently bonded to said base member; said yieldable cushion member consisting of three portions integrally attached together in the form of two longitudinal side members and an intermediate wedge-like member between said two side members.

* * * * *